US009618658B2

(12) United States Patent
Yoshida et al.

(10) Patent No.: US 9,618,658 B2
(45) Date of Patent: Apr. 11, 2017

(54) FUNCTIONAL SHEET WITH PROTECTIVE FILMS

(71) Applicants: MITSUBISHI GAS CHEMICAL COMPANY, INC., Tokyo (JP); MGC FILSHEET CO., LTD., Saitama (JP)

(72) Inventors: Ryuji Yoshida, Saitama (JP); Toshihiko Takano, Saitama (JP); Taisuke Sasagawa, Saitama (JP); Tomomi Nakayama, Saitama (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 0 days.

(21) Appl. No.: 14/892,050

(22) PCT Filed: May 21, 2014

(86) PCT No.: PCT/JP2014/063469
§ 371 (c)(1),
(2) Date: Nov. 18, 2015

(87) PCT Pub. No.: WO2014/189078
PCT Pub. Date: Nov. 27, 2014

(65) Prior Publication Data
US 2016/0109622 A1    Apr. 21, 2016

(30) Foreign Application Priority Data

May 24, 2013 (JP) ................................ 2013-109822
Nov. 27, 2013 (JP) ................................ 2013-244726

(51) Int. Cl.
*G02B 1/00* (2006.01)
*G02B 1/14* (2015.01)
*B32B 27/32* (2006.01)
*G02B 5/30* (2006.01)
*G02C 7/10* (2006.01)
*B29C 45/14* (2006.01)
*B32B 27/06* (2006.01)
*B32B 27/30* (2006.01)
*B29D 11/00* (2006.01)
*B32B 7/02* (2006.01)
*B32B 7/12* (2006.01)
*B32B 27/08* (2006.01)
*B32B 27/36* (2006.01)
(Continued)

(52) U.S. Cl.
CPC .......... *G02B 1/14* (2015.01); *B29C 45/14811* (2013.01); *B29D 11/00009* (2013.01); *B29D 11/00644* (2013.01); *B32B 7/02* (2013.01); *B32B 7/12* (2013.01); *B32B 27/06* (2013.01); *B32B 27/08* (2013.01); *B32B 27/302* (2013.01); *B32B 27/306* (2013.01); *B32B 27/32* (2013.01); *B32B 27/365* (2013.01); *G02B 1/041* (2013.01); *G02B 5/23* (2013.01); *G02B 5/305* (2013.01); *G02B 5/3033* (2013.01); *G02C 7/10* (2013.01); *B29K 2023/12* (2013.01); *B29K 2025/08* (2013.01); *B29K 2029/04* (2013.01); *B29K 2069/00* (2013.01); *B29K 2629/04* (2013.01); *B29K 2669/00* (2013.01); *B29K 2995/0034* (2013.01); *B29L 2011/0016* (2013.01); *B32B 2250/03* (2013.01); *B32B 2250/24* (2013.01); *B32B 2250/40* (2013.01); *B32B 2255/10* (2013.01); *B32B 2255/26* (2013.01); *B32B 2274/00* (2013.01); *B32B 2307/42* (2013.01); *B32B 2551/00* (2013.01)

(58) Field of Classification Search
CPC ....... B32B 27/365; B32B 27/32; B32B 27/06; B32B 27/08; B32B 27/30; B32B 7/02; B32B 7/12; B32B 27/306; G02B 1/14; G02B 5/23; G02B 5/305; G02B 1/041; B29D 11/00644; G02C 7/10; B29K 2069/00; G02F 1/1335; G02F 1/133502; G02F 1/133528
USPC ............................. 359/507, 288.01; 349/96
See application file for complete search history.

(56) References Cited

U.S. PATENT DOCUMENTS

2014/0347607 A1* 11/2014 Zhao ...................... G02B 5/305
349/96

FOREIGN PATENT DOCUMENTS

JP    6-148431    5/1994
JP    6-160630    6/1994
(Continued)

OTHER PUBLICATIONS

International Search Report issued in PCT/JP2014/063469 Patent Application No., dated Aug. 26, 2014.

*Primary Examiner* — Euncha Cherry
(74) *Attorney, Agent, or Firm* — Greenblum & Bernstein, P.L.C.

(57) ABSTRACT

A functional sheet with protective films obtained by laminating protective sheets includes aromatic polycarbonate onto a functional layer that is a polyvinyl alcohol polarizing layer or a photocromic layer or any combination thereof and having the protective films adhere to the protective sheets. The protective films have at least two or three layers i.e., a base layer composed of a polypropylene that has a melting point higher than the glass transition temperature of an aromatic polycarbonate; an adhesive layer composed of a heat plastic polyolefin elastomer composed of a polyolefin that has a melting point from a temperature that is 15° C. lower than the glass transition temperature of the aromatic polycarbonate to a temperature that is lower than the glass transition temperature and a styrene-olefin-styrene co-polyelastomer; and a middle layer composed of a polyolefin resin between the base layer and the adhesive layer.

11 Claims, 2 Drawing Sheets

(51) Int. Cl.
*G02B 1/04* (2006.01)
*G02B 5/23* (2006.01)
*B29L 11/00* (2006.01)
*B29K 669/00* (2006.01)
*B29K 23/00* (2006.01)
*B29K 25/00* (2006.01)
*B29K 29/00* (2006.01)
*B29K 69/00* (2006.01)

(56) References Cited

FOREIGN PATENT DOCUMENTS

| | | |
|---|---|---|
| JP | 2003-145616 | 5/2003 |
| JP | 2011-037243 | 2/2011 |
| JP | 2011-110879 | 6/2011 |
| WO | 2013/051723 | 4/2013 |

\* cited by examiner

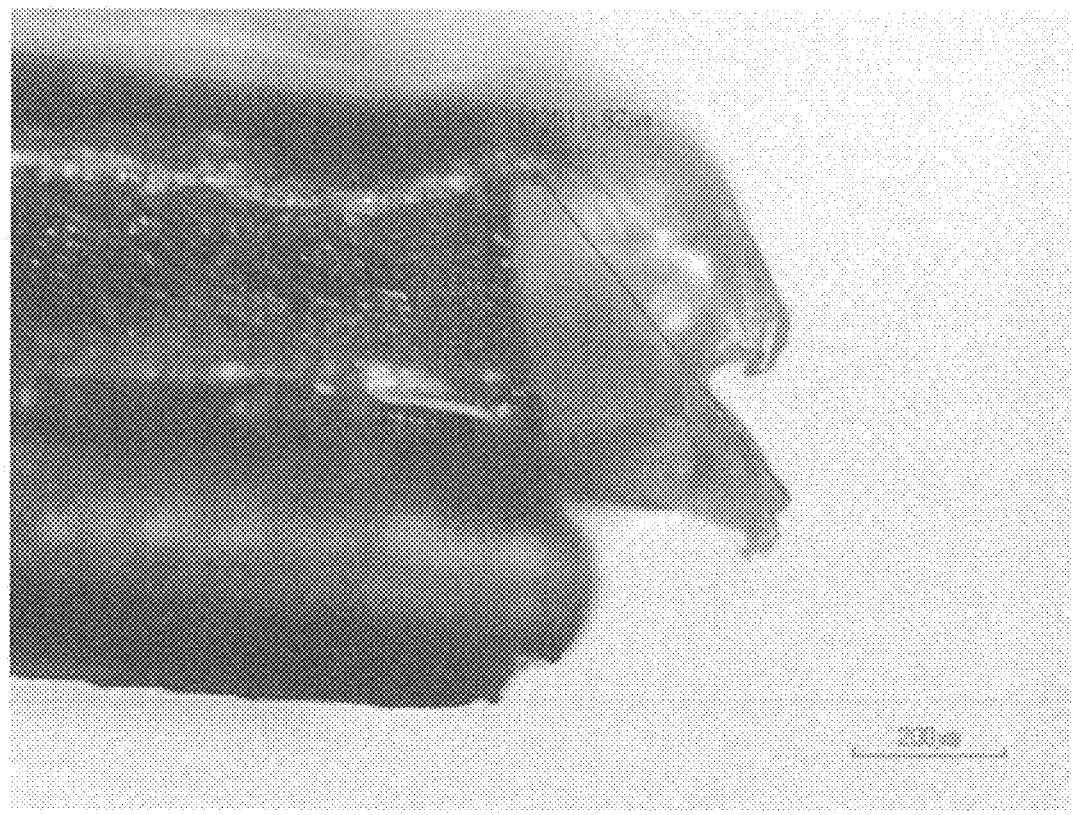
Fig. 1-A
Comparative Example 1

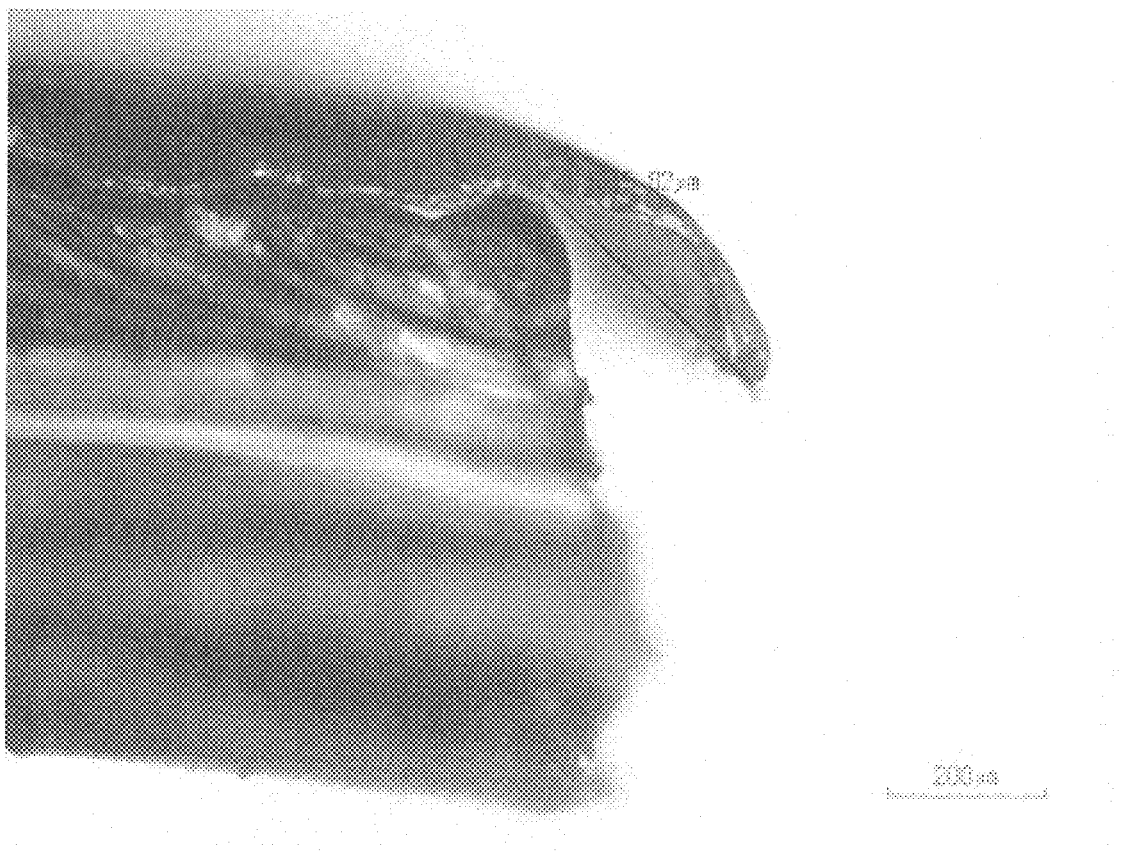
Fig. 1-B
Example 1

FUNCTIONAL SHEET WITH PROTECTIVE FILMS

TECHNICAL FIELD

The present invention relates to a functional sheet with protective films. The functional sheet is comprised of a functional layer that has polarizability and photochromic ability and protective sheets on the both surfaces of the functional sheet. The protective films protect the surface of the functional sheet during [commercial] distributions, processing steps, etc., and are caused to temporarily adhere to the surfaces of the functional sheet.

BACKGROUND

Lenses for sunglasses made from aromatic polycarbonate are produced by punching the functional sheet, which is comprised of a functional layer that has polarizability or photochromic ability or both, and the protective sheets attached to both sides of the functional layer, to form a shape of interest, curving it by using heat to form a partially spherical body, and injecting molten aromatic polycarbonate for lenses on a concave surface of the body. If necessary, the surfaces of the lenses obtained are subjected to finishing processes.

When the functional sheet is handled during commercial distribution, processing steps, etc., to protect the surfaces of the sheet from flaws, dirt, and contaminants, protective films are caused to adhere to the surfaces of the functional sheet. Specifically, polyolefin protective films were proposed. They are stable under a heat-curving process that uses high temperatures such as the glass transition temperature of an aromatic polycarbonate (Patent Documents 1 and 2).

Patent Document 1 discloses a protective film composed of two layers. One layer is a polyolefin film layer that has a substantive melting point of 150° C. or more. It is used as a surface layer. The other is a polyolefin film layer that has a substantive melting point of 125-145° C. and is used as an adhesive or gluing layer.

Patent Document 2 discloses a polyolefin film that is used as a protective film and is produced by coextrusion. The film has two melting peaks. One is 105-130° C.: (A) and the other is 160-175° C.: (B). The ratio of the areas of (A) to (B): [(A)/(B)] is 35/65-80/20.

Patent Documents 1 and 2 disclose the results of experiments to estimate the properties of products obtained by a heat-curving step (a heat-curving lens or product). However, they do not disclose any lens obtained by injection molding. Namely, they do not disclose any results of experiments to estimate the properties of products subjected to an injection molding process to produce a lens made by injection molding.

However, there is a problem that relates to a defect in the appearance of the injection molded lenses. Such a defect is seen as streaks that are white (white streaks). Such streaks are seen in a product after injection molding, i.e., an injection molded lens that is obtained by punching a functional sheet with the protective films to make the shape of interest, heat-curving to make a partially spherical product, attaching the product to an injection mold, and injecting aromatic polycarbonate on the concave surface of the product to make an injection molded lens. To increase the productivity of the injection molded lens, demands for the improved efficiency in the utilization of machines and for shortened times to produce such lenses are getting higher. But in complying with such demands, the increased frequency of white streaks was observed. This problem needs to be solved as soon as possible.

PRIOR-ART DOCUMENTS

Patent Documents

Patent Document 1: Japanese Laid-Open Patent Publication No. 2003-145616
Patent Document 2: Japanese Laid-Open Patent Publication No. 2011-110879

SUMMARY OF INVENTION

The Problem to be Solved

The subject matter of the present invention is a functional sheet with protective films. The sheet can provide an injection molded lens obtained by injecting an aromatic polycarbonate (an aromatic polycarbonate injection molded lens) that does not produce white streaks or can reduce the occurrence of them.

From the inventors' analysis of the components of the "white streaks," it is found that the components of them are polyolefin resins.

Further, from the observation of samples of products produced after a heat-curving process, it is found that resins are stuck on a punched section of the product. The resins appear to be derived from the protective films. When the section was cleaned by using a knife, etc., i.e., when the resins that are stuck are removed, the white streaks were not observed.

The heat-curving product is attached to a mold after the protective films are removed. Then the resins of interest are injected. The white streaks observed at this time are derived from the stuck resins that remain on the punched section after the protective films were peeled off. They appear to be ones that are separated and remain on the surface of the section while bearing exfoliating forces [when the protective films are peeled off]. Alternatively, they appear to be ones that become pieces produced by punching the functional sheet and by peeling off the protective films that strongly adhere to the section. The experiments to estimate the presence of the white streaks were carried out by the methods explained in the Examples.

There is some relationship between the frequency of the occurrence of the white streaks and the total number of punching times per blade. In a small number of punching times, the frequency of the occurrence of the white streaks is also small. When punching times are increased, the frequency is increased. A punching/cutting blade that has to be changed to a new one or has to be polished does not have a sharp edge, because it is worn down during the punching process.

By using a worn punching blade or a blade with a nicked edge a protective film on the functional sheet is cut after it is somewhat extended. Specifically, the edge of the blade causes to a certain extent a layer of a protective film to irrupt, and then the layer is cut when the film [on the functional sheet] is sandwiched between the edge of the blade and a backing plate. After that the blade goes back to the starting position and the punching process is finished. In such a case, after a part of the protective film is stretched, it is pressed and cut. Thus, large stretched parts, stretched parts that are cracked, or parts that are stretched and fragmentized into small pieces, are produced on the section. Such parts appear to become the white streaks.

A punched piece of the functional sheet with protective sheets is subject to a heat-curving process.

The heat-curving process is carried out at a temperature that can curve the protective sheets of the functional layer of the functional sheet with little stress. The protective sheets are heated to 134-145° C. at most, which is lower than the glass transition temperature of an aromatic polycarbonate, and are slowly transformed.

Naturally, the protective films are also heated to that temperature. Thus, the resins of them that have a melting point lower than that temperature are melted. Melting occurs on the entire surface. Thus, resins that bring about a strong adhesive strength by melting them are undesirable in the point of the adhesion of the protective film to the protective sheet.

As explained above, the resins of the extended parts of the end of a cut section of the protective film, cut pieces, and the resins of the cracked stretched part, are also melted and flow. Then, the resins that are melted and flowed are solidified at the place where the resins flow to and reach. Then they become in a state of adhesion or adhere to that place.

From the observation of the edges of the sections of the heat-curving products, one can see that some edges (ends) of the protective films project over the ends of the section of the aromatic polycarbonate the protective sheet and then fall to the outside.

Further, one can also see that although the length of the edges that fell varies depending on the types of the resins, generally it is about 100-600 μm (micro meters). The residual resins that adhered to the edges of the sections after the protective films were peeled off were not investigated.

The relationship between the length of the resins that fell and the occurrence of the white streaks are observed from the result of the production of the injection molded lenses from the heat-curving products obtained by, from which the protective films are peeled off.

Because of the melt flow of the resins derived from the protective films in the heat-curving process, the resins that form the connecting parts of the edges of the main parts of the protective films became thin. Therefore the thin parts cannot adhere to, or do not have enough adhesive strength to adhere to, the main parts of the protective films. Therefore, the resins are also separated from the main parts of the protective films. Thus, these resins remain on the edges of the respective sections of the heat-curving products.

Residues are easily produced from the heat-curving products that have large edges that have fallen. The tracks of the resins that melted and are dragged with the molten aromatic polycarbonate [in the injection molding step] are seen as the white streaks.

Thus, under the conditions that can easily produce the white streaks, i.e., by using a blade that has an edge that is not sharp and by selecting the conditions of the heat-curving process, various protective films are examined. The functional films for the aromatic polycarbonate injection molded lenses without the white streaks, or less of the white streaks, can be provided.

However, in such functional films a problem that relates to the limited scope of the preferable adhesive force was found. For example, when the functional sheet with the protective films is processed at a high temperature, the adhesiveness is increased. Thus, the removal of the protective films from the functional sheet before it is attached to a mold becomes difficult. To prevent this, if the protective films that have less adhesiveness are used, when the functional sheet is subjected to the heat-curving process, wrinkles formed by the protective sheet that have partially peeled off from the functional sheet occur. Within apertures that form the wrinkles, the additives of the adhesive layer of the protective film precipitate and remain on the surface of the heat-curving products as micro-crystals. The crystals are seen as white muddy-looking. Thus, when the protective films that have a low adhesiveness are used, the films should preferably be ones that do not form any wrinkles or do not have their adhesiveness to the functional sheet increase when the functional sheet is subjected to the hear curving process.

Further, unevennesses on the surfaces of the heat-curving products are observed. Further, as other defects of the heat-curving products called "flames" are also observed. The detailed observation of the unevennesses shows that in some products depressions are observed on the surfaces of the protective films. The locations of the depressions on the surfaces of the protective films and those of the depressions on the surfaces of the heat-curving products are consistent. More such depressions are produced depending on the amount of dust in the environment for their production. Thus, the depressions appear to be caused by dust. However, there are products that do not show any depression even though they are produced under the same environment where the unevennesses should be observed. When conventional protective films that are composed of two layers were used, the unevennesses were not observed. Further, among the candidate products of the protective films some films do not show any unevenness.

The most characteristic difference between the protective films that produce the white streaks and those that do not produce them is whether the protective films that show the white streaks have a layer of a resin that becomes the white streaks, i.e., a layer of resins that are melted and flow during the heat-curving step. When there are ten to dozens of μm (micro meters) of dust on the surface of the mold to be used for the heat-curving step, in the films without a layer of resins that are molten and flow, and therefore the white streaks are not observed, the dust pushes down the layer of the base material of the protective film. Thus, the adhesive layer of the protective film is also pushed down. The dust is pushed down, reaches the surface of the heat-curving products, and makes the depressions. However, in the products [protective films] that have a layer of resins that are melted and flow, and therefore provide the white streaks, although the dust also pushes down the base layer of the protective films, the adhesive layer that is composed of the resins that are molten, flow, and are deformed. Therefore the pushed dust appears to not reach the surfaces of the heat-curving products.

To prevent the problem from being caused by the dust the manufacturing environment has to be strictly controlled. However, in doing so the manufacturing costs have to increase and the manufacturing steps become complex.

The word "flames" means irregular images that are the transmitted images that one can see through the heat-curving products after the protective films are removed. One can see the flames from observing the heat-curving products without the protective films under a source of light so that the light transmits the products. From the observations of the surface of the protective layer of the identical heat-curving product, one can see the wavy deformations along with the irregular images on the surfaces of the protective layers (the protective sheets). Specifically, the flames are deformations that are produced by the difference in height that is less than the difference that is seen as the unevenness explained above. The border of the deformation is not clear. The flames are not uniformly on the surfaces of the heat-curving products and cannot be observed by using an optical microscope.

Strong flames occur in the products that are not observed to have the white streaks. However, in the conventional protective films that are composed of two layers the flames are weak or not observed.

The most characteristic differences between the protective films that show the flames and those that do not show them is the presence of the layer of the resins that can be melted and flow in the heat-curving process. Specifically, when the products are subjected to the hear curving process, protective films that do not have a layer of resins that are molten and flow cannot move to follow along with the change of the deformation. Thus, localized stress loading occurs. Then the minute areas of the surfaces of the heat-curving products are deformed and are observed as the flames. In contrast, for the protective films that have a layer of resins that are molten and flow, the adhesive layer of the proactive films can follow along with the deformation of the surface of the heat-curving products. Thus, the flames can be prevented.

As described above, in the protective films produced by coextrusion to have two layers and the protective films composed of two layers, the films that have a layer of resin that can melt under the conditions for the heat-curving step are preferable. Since such a layer causes the white streaks, the resins of the preferable protective films should not adhere to the cut sections even if the resins are melted.

Thus, as a result of much trial and error by the inventors, the protective films to overcome the problems explained in the previous paragraphs can be obtained. Specifically, the inventors can conceived a novel and an inventive protective film that has a middle layer that is melted at the temperature of the heat-curving step. The protective films that have the middle layer are examined under the conditions where the white streaks can be shown.

Means for Solving the Problems

Thus, the present invention is the following:
(1) A functional sheet with protective films obtained by laminating protective sheets comprised of aromatic polycarbonate onto a functional layer that is a polyvinyl alcohol polarizing layer or a photocromic layer or any combination thereof and having the protective films adhere to the protective sheets, wherein the protective films have at least two layers, i.e., a base layer that is composed of a polypropylene that has a melting point higher than the glass transition temperature of an aromatic polycarbonate and an adhesive layer that is a resin composition that comprises a polyolefin that has a melting point from a temperature that is 15° C. lower than the glass transition temperature of the aromatic polycarbonate to a temperature that is lower than the glass transition temperature and a styrene-olefin-styrene co-poly-elastomer.

In invention (1),
(2) The polypropylene that is used for the base layer is a low density polypropylene and its melting point is 150-170° C. and the thickness of the base layer is 30-60 μm.
(3) The polyolefin of the adhesive layer is a low density polyolefin and the melting point of the polypropylene is 135-145° C. and the thickness of the adhesive layer is 5-30 μm, or
(4) The protective film has a layer composed of a polyolefin resin between the base layer and the adhesive layer and the melting point of the layer composed of the polyolefin resin is lower than that of the base layer, and further,
(5) The layer composed of the polyolefin resin is a low density polyolefin and the melting point of the layer is 120-145° C., and the layer is 20-60 μm thick.

Further, the present invention relates to:
(6) A method for producing polycarbonate injection molded lens comprising these steps:
laminating protective sheets comprised of aromatic polycarbonate onto a functional layer that is a polyvinyl alcohol polarizing layer or a photochromic layer or any combination thereof and having it adhere to the protective films on the protective sheets; punching the functional sheet to form a shape of interest; heat-curving the punched sheet, setting the sheet on a mold for injection molding after removing the protective films; injecting the [molten] aromatic polycarbonate resin; and recovering a molded product, wherein the protective films have at least two layers, i.e., a base layer that is composed of a polypropylene that has a melting point higher than the glass transition temperature of an aromatic polycarbonate and an adhesive layer that is a resin composition that comprises a polyolefin that has a melting point from a temperature that is 15° C. lower than the glass transition temperature of the aromatic polycarbonate to a temperature that is lower than the glass transition temperature and a styrene-olefin-styrene co-poly-elastomer.

In invention (6):
(7) The heat-curving is carried out by slow deformation at a temperature that is at most 15-5° C. lower than the temperature of the glass transition temperature of an aromatic polycarbonate;
(8) The polypropylene that is used for the base layer is a low density polypropylene and its melting point is 150-170° C. and the base layer is 30-60 μm thick,
(9) The polyolefin of the adhesive layer is a low density polyolefin and its melting point is 135-145° C. and the adhesive layer is 5-30 μm thick,
(10) The protective film has a layer composed of a polyolefin resin between the base layer and the adhesive layer and the melting point of the polyolefin resin is lower than that of the base layer, or
(11) The layer composed of a polyolefin resin is a low density polyolefin and the melting point of the polyolefin resin is 120-145° C., and the layer that is composed of a polyolefin resin is 20-60 μm thick.

BRIEF EXPLANATIONS OF FIGURES

FIGS. 1-A and 1-B disclose photos that show sections of the heat-curving products obtained by punching the functional sheet with the protective sheet of the present invention and subjecting the punched sheet to the heat-curving process. FIG. 1-A shows a functional sheet with the protective films of Comparative example 1. FIG. 1-B shows the functional sheet with the protective films of Example 1.

EMBODIMENTS TO CARRY OUT THE INVENTION

Protective Films

The protective film of the present invention is composed of at least two layers. One is a base layer and the other is an adhesive layer. Alternatively, the film is composed of three layers where an additional middle layer is located between the base layer and the adhesive layer. The thickness of the protective films of the present invention can be selected within the scope of 50-100 µm.

The main role of the base layer of the protective film is protecting the surface of the functional sheet from flaws, stains, or contaminants that may exist during the handling of the commercial distribution or various processing steps. This is the fundamental function of the protective film. The layer should be composed of a film that has the appropriate film strength. Further, during the punching process the resins to be used for the base layer do not make any cracks that will become small pieces and do not separate from the adhesive layer. Further, they do not melt or adhere to the contacting layers when they are exposed to a temperature around the glass transition temperature of an aromatic polycarbonate in the heat-curving process. The resins maintain an [initial] adhered state with a molten adhesive layer.

Further, when many functional sheets with protective sheets are stacked and stored for a long time, the surfaces of the protective films are pressed and contacted during this storage. At this time, to prevent blocking, where the stacked surfaces cannot be separated, generally making an additional hard surface on the base layer of the protective film, applying an anti-stacking agent on the surface, etc., are done accordingly.

The base layer does not melt during the heat-curving process. The base layer is selected from polypropylenes that have a melting point higher than the glass transition temperature of an aromatic polycarbonate (a peak temperature measured by a DSC measurement). Preferably, the melting point is 150-170° C., more preferably 155-165° C. Preferably, the polycarbonate is selected from low density polypropylenes. The base layer is selected to be from 20 to 60 µm thick. High-density polypropylenes are brittle [against the stress of the punching process] and therefore residues from the punching process can be easily produced. [In contrast] polypropylenes that have low melting points bring about problems caused by their low stress strength. Thus, [in the punching process] they cannot maintain their shapes.

The protective films of the present invention may not show clear peaks in a thermal measurement. Especially, the resins to be used in the adhesive layer have densities lower than the resin of the base materials, and are very thin. Thus, generally they show low and gentle sloping peaks. Further, in the present invention, the adhesive layer is a composition of a polyolefin and a polyolefin rubber. Thus, the starting parts of the peak of the melting point of the base layer should be carefully distinguished from those of the peak of the adhesive layer.

The adhesive layer (or a temporary adhesive layer) maintains an adhesiveness to the base layer or the middle layer. Further, it has to adhere to the surfaces of the aromatic polycarbonate. When the adhesive layer is separated, no glue remains on the surface of the functional sheet. As explained above, the adhesive layer has an adhesiveness where the base layer [of the protective film] does not separate from the surface of the aromatic polycarbonate or from the base layer during the punching process. Further, the adhesive layer maintains its adhesiveness, even if it is in a molten state. An adhesive layer that has a small dependency of viscosity at a melting point and a layer that shows unclear melting points, such as low-density resins with irregular structures, or with branching structures, are exemplary resins to be used as the adhesive layer of the present invention.

The adhesive layer has a melting point between a temperature that is 15° C. lower than the glass transition temperature of the aromatic polycarbonate and a temperature that is less than the glass transition temperature. The preferable melting point of the polyolefin to be used for the adhesive layer is 135-145° C. The adhesive layer is a resin composition of a low-density polyolefin and an elastomer comprised of styrene-olefin-styrene block co-poly-elastomer. The thickness of the adhesive layer is not limited. However, it is generally from 5-30 µm.

When the polyolefin of the adhesive layer is pressed to have it adhere to the aromatic polycarbonate at room temperature, it has not enough adhesiveness to do so. When a polyolefin that has a low melting point is used alone in the adhesive layer, a strong adhesiveness is produced. Such an adhesiveness is reinforced when the adhesive layer is subjected to the heat-curving process. Then it is cooled to room temperature, but the reduction of the reinforced adhesiveness is not enough. Thus, such a polyolefin is not preferable. In contrast, if the polyolefin to be used for the adhesive layer has a high melting point, then to obtain the adhesiveness of interest more styrene-olefin-styrene copolymerized elastomer is needed. In such a case, a weak adhesiveness of the adhesive layer to the base layer is a problem. In another embodiment, if the melting point is too high, a weak adhesiveness of the adhesion layer to the middle layer is a problem.

A styrene-olefin-styrene copolymerized elastomer is denoted SBS, SIS, etc. Specifically, it is an elastomeric copolymer that is comprised of chains of polyolefins, such as an ethylene-butene copolymer, an ethylene-pentene copolymer, etc. Such polyolefin chains are obtained by hydrogenation of unsaturated double bonds of a thermoplastic elastomer, such as polybutadiene of a styrene-butadiene-styrene block copolymer and such as polyisoprene of a styrene-isoprene-styrene copolymer.

At room temperature the polystyrene chains at both ends of the polymer appear to be associated with other polystyrene chains in a state of microparticles, to thereby make structures of the pseudo-bridges of the elastomeric polyolefin chains. At room temperature, the elastomer behaves like cross-linked rubbers. At temperatures higher than the melting points of polystyrene, they are easily melted and flow.

The ratio of the components of the elastomer is selected so that the elastomeric polyolefin chains are 20-60%, preferably 28-52%, of the resin composition [of the adhesive layer].

In an adhesion (or a temporary adhesion), there is a problem that relates to a change of the adhesiveness by aging. For the purpose of the present invention, elastomers that do not show such a change are preferable. For example, in the change of the adhesiveness by aging, generally the adhesiveness (or gluing) unnecessarily increases. Therefore blocking, i.e., a state where stacked functional sheets cannot be separated, occurs. Such stacked functional sheets become unusable. The adhesiveness of the protective films of the functional sheet of the present invention shows a value for the adhesiveness that is less than that of a conventional adhesive agent. Thus, in the present invention such a problem would not arise. However, to carry out the present invention the change of the adhesiveness by aging should be considered.

The protective films of the present invention essentially have two layers. One is a base layer and the other is an adhesive layer (or a temporary gluing layer). They can have a middle layer or a support layer between the base layer and the adhesive layer (or a temporary gluing layer) or the inside of the base layer. The support layer or the middle layer is composed of polyolefin resins that have melting points lower than the melting point of the base layer.

The polyolefin resins that form the middle layer comprise polyolefins that have a melting point that is 40° C. less than the glass transition temperature of an aromatic polycarbonate, to 5° C. less than that. A preferable melting point is from 120° C. to 145° C. The middle layer is 20-60 µm thick. The middle layer becomes molten in the heat-curving process, and therefore it absorbs a local stress loading. Further, since the middle layer is sandwiched by the base layer and the adhesive layer and held there, even if it becomes molten it does not move out of the protective film.

When the melting point of the polyolefin of the middle layer is about 120° C., the layer should be about 20 µm thick to prevent the separation of it from the protective film itself. Further, when the melting point of the polyolefin of the middle layer is about 140° C., the layer should be about 40 µm thick, to increase the effect to absorb the stress loading. However, the melting point and the thickness of the middle layer should be based on the conditions of the heat-curving process and the working environment.

When the melting point of the middle layer is higher than that within the scope of the melting points disclosed above, since in the heat-curving process of a punched functional sheet the middle layer melts but does not flow, it does not absorb sufficient stress loading. Therefore the problems of wrinkles when the protective film is removed, unevenness of the surface, and the flames, are not resolved. When the melting point of the middle layer is lower than that within the scope of the melting point disclosed above, the melted middle layer that occurs during at the heat-curving process flows by the stress of the decompression or the pressure of the heat-curving process, and then the flowing middle layer becomes a projection that overhangs the base layer and the adhesive layer. The projection adheres to the section of the heat-curving products or becomes separate pieces on the section. When such a heat-curving product is used for the injection molding process after the protective films are removed, the white streaks would arise. This is not preferable.

The protective film of the present invention is generally produced by the coextrusion.

The protective films are produced by using at least two extruders, one for the base layer (a core layer) and one for the adhesive layer (or a gluing layer). Alternatively, they are produced by using three extruders, to include one additional extruder, for the middle layer. In each extruder, resins for each layer are melted and extruded. Then in a co-extruding die the molten and extruded resins contact each other to make a laminate. The laminate is pressed out from a die lip and drawn by using a roll to make the protective films. In this co-extrusion, a small amount of additives, such as a stabilizer, a remover, and a slip agent, can be added to carry out a uniform extrusion and to prevent adhesions of the resins to the roll.

Functional Sheet

The protective films disclosed above protect the surfaces of the functional sheet by adhesion of the protective films to the surfaces of the functional sheet. The functional sheet is a laminate where a functional layer that is selected from a polyvinyl alcohol polarizing film layer, a photochromic layer, or combinations thereof, is sandwiched with the aromatic polycarbonate sheets or films.

The functional film of the polyvinyl alcohol polarizing film layer is generally produced by uniaxially stretching of a polyvinyl alcohol film in an aqueous solution and adsorbing and aligning dichroic organic dyes. It is stretched to 3.5-6.5 times its original length and is treated by boric acid and metal compounds.

The photochromic layer is a layer obtained by mixing photochromic compounds (photocromic materials) with transparent resins. The photocromic materials to be used are spirooxazine-based materials, spiropyran-based materials, fulgide-based materials, diarylethene-based materials, and salicylideneaniline-based materials.

The aromatic polycarbonate sheet or film is 0.1-1 mm thick, preferably 0.2-0.5 mm thick. The retardation after the uniaxial orientation is 2,000 nm or more. Generally, 10,000 nm or less of the retardation is preferable.

The aromatic polycarbonate resin used is polymers produced according to the well-known method from a bisphenol compound typified by 2,2-bis(4-hydroxyphenyl)alkane or 2,2-(4-hydroxy-3,5-dihalogenophenyl)alkane. The polymer skeleton thereof may include a structural unit derived from a fatty acid diol or a structural unit having ester bonds. In particular, an aromatic polycarbonate produced from 2,2-bis (4-hydroxyphenyl)propane is preferred. Regarding the molecular weight of the aromatic polycarbonate, for the ability to be formed and the mechanical strength the viscosity-average molecular weight is preferably 7,000 to 40,000, and the viscosity-average molecular weight is particularly preferable when it is 20,000 to 34,000.

The functional sheet of the present invention is produced by laminating the functional layer explained above between the aromatic polycarbonate sheets or films. This lamination is carried out by laminating the aromatic polycarbonate sheets to each side of the functional films by means of an adhesive layer, and crimping them. If needed, the adhesive layer is set (cured).

Another embodiment, where a polyvinyl alcohol polarizing film is used as the functional film, is carried out by continuously applying and drying the adhesive agent on one side of the long polyvinyl alcohol polarizing film, putting and crimping the aromatic polycarbonate sheet on the side where the adhesive agent was continuously applied, and drying the adhesive agent on the other side of the long polyvinyl alcohol polarizing film, and putting and crimping the aromatic polycarbonate sheet on the side that has had applied the adhesive agent. Then the obtained laminate sheet comprised of the aromatic polycarbonate sheets and the functional layer is wound around a roller or is cut to have the size of interest, and cured.

The Functional Sheet with the Protective Films

The functional sheet with the protective films of the present invention is generally obtained by laminating the protective film, which is a continuous film, on both sides of the functional sheet, which is a continuous sheet, or a cut sheet, and crimping the films to the sheet. Crimping is generally carried out by passing the laminate body through between two rollers. It is carried out under the conditions of 10 kg/cm of pressure and 60-80° C., the temperature of the surface of the two rollers. Further, the method for laminating the protective films of the present invention is not limited to that explained above. As long as laminates have the same structures as the laminate obtained by this method, any method can be used.

Injection Molded Lends

Further, the present invention relates to a method for producing a polycarbonate injection molded lens. The method comprises of the steps of:

laminating protective sheets comprised of aromatic polycarbonate onto a functional layer that is a polyvinyl alcohol polarizing layer or a photochromic layer or any combinations thereof and adhering the protective films to the protective sheets; punching the functional sheet to form a shape of interest; heat-curving the punched sheet, setting the sheet on a mold for injection molding after removing the protective films; injecting the [molten] aromatic polycarbonate resin; and recovering a molded product.

The protective films have at least two layers, i.e., a base layer that is composed of polypropylene that has a melting point higher than the glass transition temperature of an aromatic polycarbonate and an adhesive layer that is composed of a heat plastic polyolefin elastomer [composition] that is composed of a polyolefin that has a melting point of a temperature that is 15° C. lower than the glass transition temperature of the aromatic polycarbonate to a temperature that is lower than the glass transition temperature and polyolefin rubbers.

Further, the heat-curving is carried out by a slow deformation at a temperature that is at most 15-5° C. lower than the temperature of the glass transition temperature of an aromatic polycarbonate.

Another embodiment of the present invention is the method for producing polycarbonate injection molded lens where the protective films have at least three layers, i.e., the base layer, which has a melting point higher than the glass transition temperature of the aromatic polycarbonate, the adhesive layer, which is comprised of a composition of a polyolefin and a styrene-olefin-styrene copolymeric elastomer, where the polyolefin has a melting point of a temperature that is 15° C. lower than the glass transition temperature of the aromatic polycarbonate to a temperature that is less than the glass transition temperature of the aromatic polycarbonate, and a middle layer, which is between the base layer and the adhesive layer and that has a melting point between a temperature that is 40° C. higher than the glass transition temperature of the aromatic polycarbonate and a temperature that is less than the glass transition temperature.

The functional sheet with the protective films of the present invention is subject to the punching process to cut it to form the shape of interest. For example, it can be a disk that has an 80 mm diameter or a slit shape that is cut perpendicularly in the same width at both ends. On a punching machine that has the blade of interest, e.g., Thomson blades, taking directions, etc., of the functional sheet with the protective films of the present invention and a backing plate, into consideration, they are stacked. Then the functional sheet is cut.

The cut pieces are subjected to the heat-curving process that uses the mold of interest, generally a mold that has a partially spherical body. The preheating of the pieces is carried out at a temperature that is 15-5° C. lower than the glass transition temperature of the aromatic polycarbonate. Preferably, the pieces are preheated to 130° C. or more. The cut pieces are set in a preheated female-type die. Then the pieces are gradually deformed at a temperature that is at most 15-5° C. lower than the glass transition temperature of the aromatic polycarbonate, generally at 135-145° C. The deformation generally takes 0.5-10 minutes. During the deformation, a male-type die is used accordingly.

By the temperature of the heat-curving process, the adhesive layer of the protective film of the present invention appears to be partially melted. However, it does not adhere to the cut section, and unlike the conventional protective film, therefore no white streak is produced.

The polyolefin used for the adhesive layer of the protective film has a melting point that is within the scope of the highest temperature of the heat-curving process. However, when the polyolefin is blended to make a composition to be used for the adhesive layer, the melting point of the polyolefin appears to be unclear or difficult to distinguish from the peaks of the other components of the composition. The adhesive layer of the conventional protective film shows clear peaks. A comparison of the peaks of the adhesive layer of the conventional protective film with those of the adhesive layer of the protective film of the present invention shows that the peaks of the adhesive layer of the present invention are unclear and are higher than the peaks of the adhesive layer of the conventional one.

The adhesive layer of the protective film of the present invention has a high viscosity. Thus, when it is subjected to the heat-curving process it does not flow, nor is it removed from the base layer. Further, it does not produce a molten part that adheres to the cut section of the functional sheet.

The protective films attached to the cut piece after the heat-curving process are removed. Then the piece is set on a mold of an injection molding machine and heated to the temperature of interest. Then an optical aromatic polycarbonate resin material is injected onto the cut piece to produce an aromatic polycarbonate injection molded lens.

The injection molding of the present invention is carried out by using the resin that is heated to 260-340° C., preferably to 270-310° C. The pressure to be used for the injection molding is 50-200 MPa, preferably 80-150 MPa. The temperature of the mold is 60-130° C., preferably 80-125° C.

The aromatic polycarbonate injection molded lens obtained by the steps explained above is subjected to a treatment to make a hard coat. It is further subjected to a treatment to make a mirror coat and an anti-reflective coat. Then finished products are obtained.

Preferable materials and conditions for the finished processes should be chosen based on the appearance of interest of the finished products, adhesiveness to the inorganic substances used for the mirror coat, anti-reflective coat, etc. From this point, the temperature of the calcination of the finished products is preferably a temperature from 50° C. lower than the glass transition temperature of the aromatic polycarbonate to a temperature less than the glass transition temperature. Preferably, the temperature of the calcination is a temperature from 40° C. lower than the glass transition temperature of the aromatic polycarbonate to a temperature 15° C. lower than the glass transition temperature. Preferably, it is about 120° C. The time to make the hard coat treatment is about 0.5-2 hours. Below the exemplary embodiments of the present invention are explained.

Functional Sheet

On both surfaces of a polarizing film that is 30 μm thick, aromatic polycarbonate sheets that are 0.3 mm thick are laminated by using thermosetting polyurethane-based adhesive layers to construct a functional sheet that is 0.6 mm thick, 300 mm wide, and 340 mm long (Mitsubishi Gas Chemical Co., Inc., Iupilonpola). On both surfaces of the functional sheet the protective films disclosed in Table 1 are crimped (at 10 kg/cm of loading) by using heated rollers (the temperature of the surface of each roller is 73° C.) (Examples 1 and 2 and Comparative examples 1-4).

On both surfaces of a polarizing film that is 30 μm thick, aromatic polycarbonate sheets that are 0.3 mm thick are laminated by using thermosetting polyurethane-based adhesive layers to construct a functional sheet 0.6 mm thick, 300 mm wide, and 340 mm long (Mitsubishi Gas Chemical Co., Inc., Iupilonpola). On both surfaces of the functional sheet, the protective films disclosed in Table 3 are crimped (at 10 kg/cm of loading) by using heated rollers (the temperature of the surface of each roller is 80° C.) (Examples 3, 4, and 5 and Comparative examples 5 and 6).

Next, the obtained functional sheets with the protective sheets are subjected to the punching process.

By the conventional methods the press punching process that uses Thomson blades is used. As explained in the section on the problem to be solved of the present invention, in this example the high frequency of the white streaks are necessary [to estimate the effect of the protective films in the present invention]. Thus, single-edged Thomson blades are used. The edges of the blades are set so that they face outwards. Further, five μm (micro meters) of the tops of the edges were cut off.

Shape of the Cut Piece

The shape of the punched piece of the functional sheet with the protective films is a vertical section, such as a slit shape, a capsule, or a straw rice bag, where both sides of the line that passes through the center of a disc, whose diameter is 80 mm, are cut perpendicularly in the same width, 55 mm. Both sides that are not parallel have small projections on an arc of each side. The projections are used for positioning in a mold for heat-curving process. The long direction of the cut piece is parallel to the direction of the absorption axis of the polarizing film.

The cut piece produced by the procedures explained above was subjected to the heat-curving process. In this process, the cut piece was preheated in a pre-heater. Then it was transferred to a partially spherical female die that has the curvature of interest and pressed by using a male die made of silicon rubbers. At the same time, it was absorbed by the female die by using decompression, and the male die was raised upward. The piece adsorbed onto the female die was held for the time of interest at the temperature generated by the hot air circulation. After that, the piece was recovered. These steps were carried out in a continuous heat-curving machine.

In these steps, the piece was preheated in the pre-heater where an atmosphere in the heater is maintained at 136° C. The partial spherical curvature of the female die is about 8R (about a radius of 65.6 mm). The temperature of the surface of the female die is 138° C. The time to press by the male die is 4 seconds. The piece was absorbed on the female die after the male die was raised for 9 minutes under an environment where a hot wind of 166° C. is blowing. Like the conditions of the punching blades in the punching process, these conditions were specified based on the conditions where the white streaks are easily produced.

The section of the cut piece subjected to the heat-curving process with the protective films was observed, to estimate whether the wrinkles, white cloudiness, and flames, on the protective films, occurred. The specific methods to estimate them are explained below. The results of them are summarized in Tables 2 and 4.

The protective films of the cut piece subjected to the heat-curving process were removed. Then it was transferred onto the mold cavity for injection molding. Then the aromatic polycarbonate composition (containing an ultraviolet absorber) was injected. The conditions of the injection molding process were 310° C. for the temperature of the resin, 125 MPa for the pressure of the injection, 80° C. for the temperature of the mold, and 70 seconds for the injection molding cycle.

The results of the observation of the white streaks are summarized in Tables 2 and 4.

Shape of the Cut Piece

The shape of the punched piece of the functional sheet with the protective films is a vertical section, such as a slit shape, a capsule, or a straw rice bag, where both sides of the line that passes through the center of a disc, whose diameter is 80 mm, are cut perpendicularly in the same width, 55 mm. Both sides that are not parallel have small projections on an arc of each side. The projections are used for positioning [in a mold for heat-curving process]. The long direction of the cut piece is parallel to the direction of the absorption axis of the polarizing film.

The Resin for Injection Molding

An aromatic polycarbonate resin (viscosity-average molecular weight: 23,000; Trade name: Iupiron CLS3400; Mitsubishi Engineering-Plastics Co. Ltd.)

Mold for Injection Molding

Plano lenses for no power eye-glasses: the molding cavity is a partial spherical body that has diameter that is 80 mm and about 8R. It includes an insert sheet that is corrected for an aberration and is 2 mm thick. On the opposite side of the gate of the cavity, there are projecting parts with a through hole that is used in the finishing processes for making sunglasses. The functional sheet is set on the concave surface of the mold cavity. The cavity has a projection that receives the projecting part for positioning the cut piece so that the straight parts of the slit or the straw rice bag orthogonally cross with the direction from the gate to the opposite side.

Thus, when molten resin is inserted, it is spread and moves from the gate along the partial sphere and in the concave surface, the resin hits the straight parts of the cut piece and moves over the cut piece and reaches the projecting parts located on the opposite side of the gate while gradually shrinking.

Melting Point

The melting point is measured by using DSC (differential scanning calorimetry). The rate of the temperature increase is 10° C./min. The weight of a sample is 10 mg.

Observation of the Section

On the section of the cut and heated curved piece, a part of the protective film on the cut section was observed as a projecting and falling part. The part adhered to the cut section of the functional sheet. This observation was carried out by using an optical microscope. The length of the projecting and falling part of the protective film was measured by subtracting the thickness of the protective film.

Occurrence of White Streaks

The presence of the white streaks is observed by visual inspection. The white streaks are seen as growing white lines from the end of the cut surface along with the direction of the flow of the injected resin and in between the cut piece and injected resins. Most of the white streaks are 1-2 cm long. In this example, several millimeters of white lines are also defined as white streaks.

Occurrence of the wrinkles produced by the separation of the adhesive layer of the protective films and the surface of the functional sheet The wrinkles of the heat-curving products were produced by the separation of the adhesive layer of the protective films and the surface of the functional sheet. They were 5-10 mm long. The estimation of the wrinkles were carried out by visual inspection.

Exfoliation of the Protective Films

The exfoliation of the protective films from the functional sheet after the heat-curving process was estimated as to whether the film could be manually peeled off.

Unevenness

The unevenness is seen as shape changes on the surface of the protective film on the heat-curved functional sheets. The depth of the concave parts of the shape changes were about 20-100 μm. About 100-600 μm of the length or width of the concave parts were observed by visual inspection by using the light of a fluorescent lamp reflected from the surface of the sample.

Flames

The flames were seen as changes on the shape of the surface of the protective film of the heat-curved products. They were observed by visual inspection where a sample is placed between a fluorescent lamp and the eyes of an observer.

TABLE 1

|  |  | Example 1 | Example 2 | Comparative Example 1 | Comparative Example 2 | Comparative Example 3 | Comparative Example 4 |
| --- | --- | --- | --- | --- | --- | --- | --- |
| Method for producing the protective film | | Coextrusion | Coextrusion | Stacked product of two sheets | Coextrusion | Coextrusion | Coextrusion |
| Total thickness (μm) | | 70 | 70 | 90 | 70 | 50 | 70 |
| Adhesive layer | Type of resin | PPSM1 | PPSM1 | PE1 | PE2 | PE2 | PPSM2 |
| | thickness (μm) | 20 | 20 | 50 | 20 | 20 | 20 |
| Base layer | Type of resin | PP1 | PP1 | PP1 | PP1 | PP1 | PP1 |
| | thickness (μm) | 30 | 30 | 40 | 30 | 30 | 30 |
| Support layer | Type of resin | — | PP2 | — | — | — | — |
| | thickness (μm) | — | 20 | — | — | — | — |
| Melting point (° C.) | Adhesive layer | 138 | 142 | 125 | 88 | 128 | 128 |
| | Base layer | 165 | 163 | 166 | 163 | 163 | 165 |
| | Support layer | — | 142 | — | — | — | — |

Notes:
PPSM1: a composition of a low-density polypropylene that has a melting point of about 140° C. and a SEBE elastomer.
*SEBS elastomer: styrene-ethylene-butene-styrene copolymer
PPSM2: a composition of a low-density polypropylene that has a melting point of about about 130° C. and a SEBE elastomer.
PP1: a low-density polypropylene that has a melting point of about 160° C.
PP2: a low-density polypropylene that has a melting point of about 140° C.
PE1: a high-density polypropylene that has a melting point of about 120° C.
PE2: a low-density polypropylene that has a melting point of about 90° C.

TABLE 2

|  |  | Example 1 | Example 2 | Comparative Example 1 | Comparative Example 2 | Comparative Example 3 | Comparative Example 4 |
| --- | --- | --- | --- | --- | --- | --- | --- |
| Projecting and falling part | Size (μm) | 136 | 168 | 503 | 322 | 382 | 94 |
| Exfoliation | ○X | ○ | ○ | ○ | ○ | ○ | X |
| White streaks | Yes/No | No | No | Yes | Yes | Yes | No |
| | Incidence (%) | 0 | 0 | 93.6 | 88.3 | 86.0 | 0 |

Note:
Exfoliation○: The protective films were smoothly peeled off.
ExfoliationX: The protective films could not be peeled off.

TABLE 3

|  |  | Example 3 | Example 4 | Example 5 | Comparative Example 5 | Comparative Example 6 |
| --- | --- | --- | --- | --- | --- | --- |
| Method for producing the protective film | | Coextrusion | Coextrusion | Coextrusion | Stacked product of two sheets | Coextrusion |
| Total thickness (μm) | | 74 | 71 | 70 | 90 | 67 |
| Adhesive layer | Type of resin | PPSM | PPSM | PPSM | PE1 | PPSM |
| | thickness (μm) | 22 | 21 | 19 | 50 | 18 |
| Base layer | Type of resin | PP1 | PP1 | PP1 | PP1 | PP1 |
| | thickness (μm) | 18 | 22 | 21 | 40 | 49 |

TABLE 3-continued

|  |  | Example 3 | Example 4 | Example 5 | Comparative Example 5 | Comparative Example 6 |
|---|---|---|---|---|---|---|
| Middle layer | Type of resin | PP2 | PP4 | PP3 | — | — |
|  | thickness (μm) | 34 | 28 | 30 | — | — |
| Melting point ° C. | Adhesive layer | 139 | 141 | 140 | 125 | 142 |
|  | Base layer | 160 | 161 | 162 | 165 | 163 |
|  | Middle layer | 142 | 120 | 131 | — | — |

Notes:
PPSM: a composition of a low-density polypropylene that has a melting point of about 140° C. and a SEBE elastomer.
*SEBS elastomer: styrene-ethylene-butene-styrene copolymer
PP1: a low-density polypropylene that has a melting point of about 160° C.
PP2: a low-density polypropylene that has a melting point of about 140° C.
PP3: a low-density polypropylene that has a melting point of about 130° C.
PP4: a low-density polypropylene that has a melting point of about 120° C.
PE1: a high-density polyethylene that has a melting point of about 120° C.

TABLE 4

|  |  | Example 3 | Example 4 | Example 5 | Comparative Example 5 | Comparative Example 6 |
|---|---|---|---|---|---|---|
| Wrinkles |  | ○X | ○ | ○ | ○ | X | X |
| Exfoliation |  | ○X | ○ | ○ | ○ | ○ | X |
| Flames |  | ○X | ○ | ○ | ○ | ○ | X |
| Unevenness |  | ○X | ○ | ○ | ○ | ○ | X |
| White streaks | Incidence (%) | 0 | 0 | 0 | 98 | 0 |
| White cloudiness |  | ○X | ○ | ○ | ○ | ○ | X |

Notes:
White streaks○: No white streak in the lens.
White streaksX: White streaks several millimeters or more long were observed.
Wrinkles○: No wrinkle on the surface of the protective film
WrinklesX: Wrinkles on the surface of the protective film were observed.
Exfoliation○: The protective films are smoothly peeled off.
ExfoliationX: The protective films cannot be peeled off.
Unevenness○: No unevenness on the functional film after the protective films were peeled off.
UnevennessX: Unevenness on the functional film after the protective films were peeled off was observed.
White cloudiness○: No white cloudiness in the injection molded lens
White cloudinessX: White cloudiness in the injection molded lens was observed.

INDUSTRIAL APPLICABILITY

The present invention provides a functional sheet with the protective films. By using this functional sheet, aromatic polycarbonate injection molded lenses that show reduced defects derived from the conditions of the steps of processing the sheet, such as white streaks, wrinkles of the protective film derived from the exfoliation between the adhesive layer and the surface of the functional sheet, and the unevenness of the protective film, can be provided.

The invention claimed is:

1. A functional sheet with protective films obtained by laminating protective sheets comprised of aromatic polycarbonate onto a functional layer that is a polyvinyl alcohol polarizing layer or a photocromic layer or any combination thereof and having the protective films adhere to the protective sheets,
wherein the protective films have at least two layers, i.e.,
a base layer that is composed of a polypropylene that has a melting point higher than the glass transition temperature of an aromatic polycarbonate and
an adhesive layer that is a resin composition that comprises a polyolefin that has a melting point from a temperature that is 15° C. lower than the glass transition temperature of the aromatic polycarbonate to a temperature that is lower than the glass transition temperature and a styrene-olefin-styrene co-poly-elastomer.

2. The functional sheet with protective films of claim 1, wherein the polypropylene that is used for the base layer is a low density polypropylene and its melting point is 150-170° C. and the thickness of the base layer is 30-60 μm.

3. The functional sheet with protective films of claim 1, wherein the polyolefin of the adhesive layer is a low density polyolefin and the melting point of the polyolefin is 135-145° C. and the thickness of the adhesive layer is 5-30 μm.

4. The functional sheet with protective films of claim 1, wherein the protective film has a layer composed of a polyolefin resin between the base layer and the adhesive layer and the melting point of the layer composed of the polyolefin resin is lower than that of the base layer.

5. The functional sheet with protective films of claim 4, wherein the layer composed of the polyolefin resin is a low density polyolefin and the melting point of the layer is 120-145° C., and the layer is 20-60 μm thick.

6. A method for producing polycarbonate injection molded lens comprising these steps:
laminating protective sheets comprised of aromatic polycarbonate onto a functional layer that is a polyvinyl alcohol polarizing layer or a photochromic layer or any combination thereof and having protective films adhere onto the protective sheets to obtain a functional sheet with protective films;

punching the functional sheet to form a shape of interest;

heat-curving the punched functional sheet and setting the sheet on a mold for injection molding after removing the protective films;

injecting the [molten] aromatic polycarbonate resin; and recovering a molded product, wherein the protective films have at least two layers, i.e., a base layer that is composed of a polypropylene that has a melting point higher than the glass transition temperature of an aromatic polycarbonate and an adhesive layer that is a resin composition that comprises a polyolefin that has a melting point from a temperature that is 15° C. lower than the glass transition temperature of the aromatic polycarbonate to a temperature that is lower than the glass transition temperature and a styrene-olefin-styrene co-poly-elastomer.

7. The method for producing polycarbonate injection molded lens of claim 6, wherein the heat-curving is carried out by slow deformation at a temperature that is 15-5° C. lower than the temperature of the glass transition temperature of an aromatic polycarbonate.

8. The method for producing polycarbonate injection molded lens of claim 6, wherein the polypropylene that is used for the base layer is a low density polypropylene and its melting point is 150-170° C. and the base layer is 30-60 μm thick.

9. The method for producing polycarbonate injection molded lens of claim 6, wherein the polyolefin of the adhesive layer is a low density polyolefin and its melting point is 135-145° C. and the adhesive layer is 5-30 μm thick.

10. The method for producing polycarbonate injection molded lens of claim 6, wherein the protective film has a layer composed of a polyolefin resin between the base layer and the adhesive layer and the melting point of the polyolefin resin is lower than that of the base layer.

11. The method for producing polycarbonate injection molded lens of claim 6, wherein the layer composed of a polyolefin resin is a low density polyolefin and the melting point of the polyolefin resin is 120-145° C., and the layer that is composed of a polyolefin resin is 20-60 μm thick.

* * * * *